United States Patent
Lepo et al.

(10) Patent No.: US 12,435,472 B2
(45) Date of Patent: Oct. 7, 2025

(54) SURFACE SIZE COMPOSITION AND ITS USE

(71) Applicant: KEMIRA OYJ, Helsinki (FI)

(72) Inventors: Anneli Lepo, Espoo (FI); Paula Hirsilä, Espoo (FI)

(73) Assignee: KEMIRA OYJ, Helsinki (FI)

( * ) Notice: Subject to any disclaimer, the term of this patent is extended or adjusted under 35 U.S.C. 154(b) by 268 days.

(21) Appl. No.: 18/024,622

(22) PCT Filed: Sep. 16, 2021

(86) PCT No.: PCT/FI2021/050613
§ 371 (c)(1),
(2) Date: Mar. 3, 2023

(87) PCT Pub. No.: WO2022/058656
PCT Pub. Date: Mar. 24, 2022

(65) Prior Publication Data
US 2023/0366153 A1    Nov. 16, 2023

(30) Foreign Application Priority Data
Sep. 18, 2020 (FI) ..................... 20205903

(51) Int. Cl.
*D21H 21/16* (2006.01)
*D21H 17/23* (2006.01)
*D21H 17/28* (2006.01)
*D21H 17/66* (2006.01)

(52) U.S. Cl.
CPC ............ *D21H 21/16* (2013.01); *D21H 17/23* (2013.01); *D21H 17/28* (2013.01); *D21H 17/66* (2013.01)

(58) Field of Classification Search
CPC ........ D21H 17/23; D21H 17/66; D21H 21/16; D21H 17/28
See application file for complete search history.

(56) References Cited

U.S. PATENT DOCUMENTS

| 4,861,376 A | 8/1989 | Edwards et al. |
| 6,228,217 B1 | 5/2001 | Dickerson et al. |
| 2016/0145480 A1 | 5/2016 | Krigstin et al. |
| 2020/0140658 A1 | 5/2020 | Nelson et al. |
| 2021/0148052 A1 | 5/2021 | Bohn-Stoltz et al. |

FOREIGN PATENT DOCUMENTS

| CN | 102061642 A | | 5/2011 | |
| CN | 102912691 A | * | 2/2013 | |
| CN | 109477308 A | | 3/2019 | |
| CN | 114411444 A | * | 4/2022 | |
| EP | 0686727 A2 | | 12/1995 | |
| EP | 0723047 A2 | | 7/1996 | |
| EP | 1314822 A1 | | 5/2003 | |
| EP | 3561177 A1 | | 10/2019 | |
| WO | WO-0047819 A1 | * | 8/2000 | ............. D21H 21/16 |
| WO | WO-0063493 A1 | * | 10/2000 | ............. D21H 17/72 |
| WO | 2012090496 A1 | | 7/2012 | |
| WO | 2015086783 A1 | | 6/2015 | |

OTHER PUBLICATIONS

Search Report issued in Chinese Application No. 2021800640097 issued on Sep. 2, 2024.
Search report from Finnish Patent and Registaration Office for corresponding application FI20205903 mailed on May 18, 2021, 2 pages.
International Search report and Written opinion in corresponding application PCT/FI2021/050613, dated Dec. 21, 2021, 10 pages.
Abbadessa, Anna, et al. "Characterization of Two Novel Bio-based Materials from Pulping Process Side Streams: Ecohelix and CleanFlow Black Lignin", BioResources 13(4), 7606-7627, 2018.
Dominguez-Robles, Juan, et al. "Aqueous acetone fractionation of kraft, organosolv and soda lignins" International Journal of Biological Macromolecules 106 (2018) 979-987.
Dong, Liying et al. "The water resistance of corrugated paper improved by lipophilic extractives and lignin in APMP effluent" J.Wood. Sci (2015) 61: 412-419.

* cited by examiner

*Primary Examiner* — Abbas Rashid
(74) *Attorney, Agent, or Firm* — Meunier Carlin & Curfman LLC

(57) ABSTRACT

The invention relates to a surface size composition for surface sizing of paper, board, or the like. The composition comprises at least an aluminium compound and an anionic lignin-carbohydrate complex.

20 Claims, No Drawings

SURFACE SIZE COMPOSITION AND ITS USE

CROSS REFERENCES

This application is a U.S. national stage application of international patent application number PCT/FI/2021/050613 filed on Sep. 16, 2021 claiming priority to Finnish national application number FI20205903 filed on Sep. 18, 2020.

FIELD OF INVENTION

The present invention relates to an aqueous surface size composition for paper, board or the like and its use according to the preambles of the enclosed independent claims.

Various properties of paper or board can be modified by surface sizing. For example, surface sizing can be used to increase hydrophobicity of the paper/board surface or to improve the strength properties and printability of paper/board. In conventional surface sizing the size composition is applied in solution form on the surface of least partially dried fibre web.

Typically, surface size compositions comprise mainly starch, which enhances the strength properties and smoothens the surface of the substrate. However, starch is hydrophilic, which may cause reduced hydrophobicity of the sized surface, and this may lead to undesirable trade-off between the obtained strength and reduced hydrophobicity. This means that in order to improve or maintain the water resistance of the sized surface, it is necessary to add one or more hydrophobation agents to the surface size composition or increase water resistance of the substrate itself, e.g. by using internal sizing. In the latter case the hydrophobation agent is added to the stock itself before formation of the paper or board.

Many components used in surface sizing size compositions, apart from starch, are synthetic polymers or other synthetic compounds. Synthetic compounds are used on surface sizing especially for improving the hydrophobicity of the surface. The recent general trend towards more sustainable production processes and products also in paper and board industry emphasizes the importance of using materials originating from renewable sources. This trend has increased the interest to find new alternatives for synthetic components, especially for hydrophobation agents, used in surface size compositions. For example, lignin has been studied for use in surface treatment, but its use in commercial applications has been limited due to its weak hydrophobation effect. Consequently, there is still need for new surface size compositions with components from renewable sources that would provide the desired properties for the surface size.

SUMMARY OF THE INVENTION

An object of this invention is to minimise or possibly even eliminate the disadvantages existing in the prior art.

An object is also to provide a surface size composition, which comprises a hydrophobation agent obtained from renewable sources.

A further object of this invention is also to provide a surface size composition, which is easy to prepare and which provides good surface sizing results, especially both in view of strength properties and hydrophobation effects.

These objects are attained with the invention having the characteristics presented below in the characterising parts of the independent claims. Some preferable embodiments are disclosed in the dependent claims.

The features recited in the dependent claims and the embodiments in the description are mutually freely combinable unless otherwise explicitly stated.

The exemplary embodiments presented in this text and their advantages relate by applicable parts to all aspects of the invention, even though this is not always separately mentioned.

Typical aqueous surface size composition according to present invention for sizing of paper, board or the like comprises at least an aluminium compound and an anionic lignin-carbohydrate complex.

Typical use of a surface size composition according to the present invention is for surface sizing of sheet-like fibrous substrate comprising cellulosic fibres, such as paper, board, or the like.

Now it has been surprisingly found that a surface size composition comprising an aluminium compound and an anionic lignin-carbohydrate complex, where the lignin and carbohydrate are covalently bound directly with each other, provides unexpectedly improved hydrophobicity for the sized paper or board surface. The surface size compositions which are thus obtained provide at least similar, sometimes even improved, sizing results than the surface size compositions where conventional synthetic polymer-based hydrophobation agents are used. The present invention provides a possibility to effectively decrease the use of petroleum-based synthetic hydrophobation agents and to increase the use of substances originating from renewable sources. The present invention provides possibility to use material from renewable sources for improvement of hydrophobation of paper and board without additional oil-based hydrophobation agents.

DETAILED DESCRIPTION OF THE INVENTION

The anionic lignin-carbohydrate complex suitable for use in the present invention is a natural polymeric complex that comprises lignin and carbohydrate(s), preferably hemicellulose(s), which are covalently bound with each other. The lignin-carbohydrate complex is thus a conjugate of lignin and carbohydrate(s), which are irreversibly bound which each other to an integral structure. Lignin and carbohydrate(s) of the complex cannot be separated from each other without permanently damaging the structure of the complex. The anionic lignin-carbohydrate complex may have a branched structure.

For example, the lignin or the carbohydrate may form a backbone structure for the complex and the other component, either carbohydrate or lignin, may form pendant groups, which are covalently bound to the backbone structure.

The lignin-carbohydrate complex may be formed of lignin and one or more of carbohydrates, such as hemicelluloses. The carbohydrate(s) in the lignin-carbohydrate complex may preferably be formed from monosaccharides, such as galactose, glucose, mannose, arabinose and/or xylose or their fragments or their residues, which are covalently bound to the lignin. The exact amount of the monosaccharides in the lignin-carbohydrate complex and their relative ratios depend on the wood species, e.g. hardwood/softwood, which has been used in the pulping process and from which the lignin-carbohydrate complex originates. The monosaccharides may be present in the lignin-carbohydrate complex as sugar residues, covalently bound to the lignin.

The lignin-carbohydrate complex may comprise anionic functional groups, which may be sulfonate groups, carboxyl groups and/or phenolic groups. The lignin-carbohydrate complex may comprise, for example, >1300-1700 µmol/g, preferably 1400-1600 µmol/g of sulfonate groups; 300-500 µmol/g, preferably 350-450 µmol/g of carboxyl groups; and/or 125-250 µmol/g, preferably 150-225 µmol/g of phenolic groups.

The lignin-carbohydrate complex, suitable for use in the present invention, may be obtained, for example, from a side stream of a pulping process. In one embodiment, a suitable lignin-carbohydrate complex may be obtained by enzymatic treatment of lignin-carbohydrate material originating from a pulping process. For example, the lignin-carbohydrate complex may be obtained by isolating lignin-carbohydrate material from side streams of wood pulping processes by filtration, such as membrane filtration, and by processing the said isolated lignin-carbohydrate material by enzymatic processing employing preferably laccase enzyme. Alternatively, lignin-carbohydrate complex may be isolated from lignocellulosic material, such as wood or pulp, by using separation and fractionation methods known as such. For example, it is possible to isolate lignin-carbohydrate complexes by fractionating lignin from an industrial process, such as kraft pulping or sulphite pulping. Suitable lignin fractionating methods include, for example, solvent fractionation or precipitation fractionation. In solvent fractionation various organic solvents and their binary mixtures may be employed, such as acetone-hexane, acetone-water, ethanol-water, propyleneglycol monomethyl ether-water. Such fractionation method is described, inter alia, in Int. J. Biol. Macromolecules 106 (2018) 979-987.

According to one preferable embodiment of the invention the anionic lignin-carbohydrate complex is an anionic lignosulfonate-carbohydrate complex. It can be obtained, for example, by membrane filtration of a pre-hydrolysis mixture from a sulphite pulping process of wood, and thereafter treated by an enzymatic oxidative treatment, preferably by laccase enzyme. Preferably the filtered pre-hydrolysis mixture is obtained from a sulphite pulping process of wood. The pre-hydrolysis mixture may contain wood-based components and pulping chemicals. Suitable anionic lignosulfonate-carbohydrate complex is disclosed e.g. in BioResources 13(4), 7606-7627, 2018, and they are commercially available from Ecohelix AB, Sweden.

The anionic lignin-carbohydrate complex may have an anionic charge density less than −0.2 meq/g, preferably less than −0.5 meq/g, more preferably less than −0.85 meq/g, measured at pH 7. The anionic charge density of the complex may be from −0.2 meq/g to −2.5 meq/g, preferably from −0.5 meq/g to −2.4 meq/g, more preferably from −0.85 meq/g to −2.3 meq/g measured at pH 7. Sometimes the anionic charge density of the complex may be from −0.5 meq/g to −1.75 meq/g, preferably from −0.85 to −1.5 meq/g, measured at pH 7. The anionic charge density of the complex may even be from −2.0 meq/g to −2.3 meq/g, preferably from −2.1 to −2.2 meq/g, measured at pH 7. All charge density values are given as per dry substance, and measured by using a Mütek Particle Charge Detector.

The lignin-carbohydrate complex may have a weight average molecular weight>3500 g/mol, preferably >4000 g/mol, more preferably >5000 g/mol. The lignin-carbohydrate complex may have the weight average molecular weight MW in a range of 3500-90 000 g/mol, preferably 4 000-80 000 g/mol, more preferably 5000-70 000 g/mol.

According to one preferable embodiment, the lignin-carbohydrate complex may preferably have relatively high molecular weight. It is assumed, without wishing to be bound by a theory, that the high molecular weight provides at least some of the surprising effects that have been observed. The lignin-carbohydrate complex may have a weight average molecular weight MW>12 000 g/mol, preferably >15 000 g/mol, more preferably >20 000 g/mol or >25 000 g/mol. The lignin-carbohydrate complex may have the weight average molecular weight MW in a range of 8 000-50 000 g/mol or 10 000-45 000 g/mol, preferably 12 000-40 000 g/mol or 15 000-37 000 g/mol. Sometimes the lignin-carbohydrate complex may have the weight average molecular weight MW in a range of 20 00045 000 g/mol, preferably 25 000-40 000 g/mol, more preferably 25 000-35 000 g/mol or 25 000-27 000 g/mol. According to one specific embodiment, the lignin-carbohydrate complex may have the weight average molecular weight MW in a range of 15 000-120 000 g/mol or 20 000-90 000 g/mol, preferably 25 000-80 000 g/mol, more preferably 30 000-70 000 g/mol.

The lignin-carbohydrate complex may comprise lignin and carbohydrates, preferably hemicelluloses, in a ratio from 90:10 to 10:90, preferably from 80:20 to 20:80, more preferably from 75:25 to 25:75 (lignin:carbohydrate). According to one embodiment of the invention the lignin-carbohydrate complex may comprise at least 10 weight-%, preferably at least 15 weight-% of carbohydrate(s), preferably hemicellulose(s), calculated from total dry weight of the complex. The lignin-carbohydrate complex may comprise carbohydrate(s) in a range of 10-40 weight-%, 10-30 weight-% or 15-25 weight-%, calculated from total dry weight of the complex.

The surface size composition may comprise anionic lignin-carbohydrate complex in amount of 5-100 weight-%, preferably 9-99 weight-%, more preferably 15-98 weight-%, even more preferably 18-85 weight-%, and sometimes even 25-65 weight-%, calculated from the dry solids content of the surface size composition. It is assumed that possible minor impurities, such as inorganic salts associated with the lignin-carbohydrate complex, may be included in the weight of the anionic lignin-carbohydrate complex The surface size composition typically has a solids content of 1-30 weight-%, preferably 3-25 weight-%, more preferably 5-15 weight-%, even more preferably 7-13 weight-%, calculated as dry solids. The surface size composition may have a solids content of 6-14 weight-%, preferably 7-11 weight-%, calculated as dry solids. The surface size composition comprises, preferably consists of, water as the solvent.

Viscosity of the surface size composition is <200 mPas, preferably <100 mPas, more preferably <50 mPas, measured at 25° C. with Brookfield LVDV viscometer in a small sample adapter with spindle 18, 60 rpm at <50 mPas, 30 rpm at 50-200 mPas. The viscosity provides proper application results when using conventional application techniques.

The surface size composition may further comprise at least one aluminium compound. Suitable aluminium compounds may be selected, for example, from polyaluminium chlorides, alum, and aluminium sulphates. The surface size composition may comprise aluminium compound in amount of 0.01-6, preferably 0.04-4, more preferably 0.07-2, even more preferably 0.1-1.6, given as weight-% of aluminium ions in dry solids of the surface size composition. The surface size composition may comprise aluminium compound, especially polyaluminium chlorides, in amount of 0.02-1.5, preferably 0.05-1.35, even more preferably 0.09-1.30 or 0.15-0.99, given as weight-% of aluminium ions in dry solids of the surface size composition.

In some embodiments the surface size composition may be free of aluminium compounds. It has been observed that in absence of aluminium compound the surface size composition is still able to provide improved strength performance results, even if the hydrophobation effect may be reduced.

Polyaluminium chlorides, in solution form, suitable for use in the surface size composition according to the present invention may contain aluminium (as $Al^{3+}$) in amount of 4-15 weight-%, preferably 6-14 weight-%, more preferably 8-13 weight %, even more preferably 8.5-10 weight-%. Polyaluminium chlorides, in solution form, may contain $Al_2O_3$ in amount of 1-25 weight-%, preferably 5-22 weight-%, more preferably 7-20 weight-%, even more preferably 15-18 weight-%. Basicity of a polyaluminium chloride solution may be 25-85%, preferably 25-75%, more preferably 30-65%, even more preferably 35-50%. The polyaluminium chlorides, may contain chloride (as $Cl^-$) in amount of 7-25 weight-% or 15-25 weight-% or 19-23 weight-%.

According to one preferable embodiment the surface size composition comprises, in addition to lignin-carbohydrate complex and optional aluminium compound(s), also a polysaccharide, preferably starch or a starch derivative. Starch may be any starch suitable for use in surface sizing of paper or board, such as potato, waxy potato, rice, corn, waxy corn, wheat, barley, or tapioca starch. The used starch is preferably degraded starch, such as degraded potato, tapioca, corn, or wheat starch. In principle, any degraded starch is suitable for use in the present invention, and the used starch may be degraded in any suitable method or their combinations, which are known in the art. For example, degraded starch may be obtained by subjecting the starch to chemical, thermal, or enzymatic degradation, the chemical or enzymatic degradation being preferred. Chemical degradation encompasses both acidic and oxidative degradation, the oxidative degradation being preferred. Hypochlorite, peroxodisulphate, hydrogen peroxide or their mixtures may be used as oxidizing agents.

The starch may be non-ionic starch or net anionic starch. The net anionic starch may contain cationic groups as long as its net charge is anionic. The surface size composition may comprise starch in amount of 0-95 weight-%, preferably 1-91 weight-%, more preferably 2-85 weight-%, even more preferably 15-82 weight-%, and sometimes even preferably 30-75 weight-%, calculated from the dry solids content of the surface size composition. For example, the surface size composition may comprise starch in an amount of 0-80 weight-%, preferably 10-75 weight-%, more preferably 35-70 weight-%, calculated from the dry solids content of the surface size composition.

It has been observed that even if starch amount in the surface size composition may be reduced, the obtained strength effect is at least similar or even improved.

The surface size composition may also comprise additional components, such as brighteners, defoamers, biocides and/or crosslinkers, such as glyoxal. The surface size composition may contain also additional hydrophobation agent for example poly(styrene acrylate), AKD or rosin. The additional hydrophobation agent is preferably anionic or amphoteric with net anionicity.

The surface size composition is preferably free of inorganic mineral fillers and/or inorganic mineral pigments.

According to one embodiment the surface size composition according to the present invention improves the strength properties of the final paper or board, especially the compression strength expressed as the SCT strength, even in high humidity conditions. The compression strength, expressed as SCT strength of the paper, board or the like, is measured according to ISO 9895 standard (2008), either when exposed to standard environmental conditions (+23° C., relative humidity 50%) or when exposed to environmental conditions where relative humidity is 80%, preferably 85%, more preferably ≥90%, and the temperature is ≥30° C., preferably ≥35° C., more preferably ≥38° C. Short-span Compression Test (SCT) strength may be used to predict the compression resistance of the final product, e.g. cardboard box. Boxes made of containerboard are exposed to high loads while being piled in the storage and during the transportation which makes the compression strength, i.e. SCT strength, probably one of the more important of the strength properties of paper or board. Strength properties of paper and board easily become especially critical when the products are exposed to environmental conditions where relative humidity is ≥80%, preferably ≥85%, more preferably ≥90%, and the temperature is ≥30° C., preferably ≥35° C., more preferably ≥38° C.

The surface size composition according to the present invention is suitable for surface sizing of all cellulosic products, in particular for all paper and paper board grades. The cellulosic products, such as paper or board, may be unsized or they may be internally presized, for example by addition of an internal size, such as alkylketene dimer, alkenylsuccinic anhydride or rosin, to the fibre stock before web formation.

The surface size composition according to the present invention is especially suitable for paper or board, which may be based 100% on primary fibres, 100% on recycled fibres, or on any possible blend between primary and recycled fibres. The surface size composition according to the present invention is especially suitable for surface sizing of board made of recycled fibres. For example, the fibres in the stock may comprise at least 80% recycled fibres, preferably at least 90% recycled fibres, sometimes even 100% recycled fibres. All percentages are given as weight-%, calculated from dry total fibre weight. Recycled fibres may originate from old corrugated cardboard and/or mixed paper grades. Preferably a mixture of old corrugated cardboard and mixed paper grades is used for recycled fibres.

The surface size composition according to the present invention may be applied on to a paper or board surface by using any suitable technique available, and commonly used for surface sizing of paper, board, or the like. For example, the surface size composition may be provided as a liquid or a foam onto the cellulose-based product, such as paper or board web. For instance, the aqueous surface size composition may be applied to the surface of the paper or board by using a puddle size press, a film size press or a size press employing a roll or a doctor knife blade in size application.

Alternatively, the surface size composition may be sprayed onto the paper or board web or be applied by dipping the paper or board into the aqueous surface size composition. Cellulosic product, such as paper or board, treated with the surface size solution according to the present invention is dried at elevated temperatures, typically temperature of the paper or board may be from 80 to 110° C.

According to one embodiment of the invention the surface size composition may be applied on the surface of a fibre web in amount of at least 0.5 g/m²/side, preferably at least 1.3 g/m²/side, more preferably 1.3-5.0 g/m²/side, more preferably 1.4-3.2 g/m²/side, given as dry solids. These application amounts are especially preferred for surface sizing of liner and fluting.

EXPERIMENTAL

Some embodiments of the invention are described in the following non-limiting examples.

Sizing performance of the surface size compositions were tested on an internally unsized linerboard which had base weight of 140 g/m². The temperature of surface size composition was set at 65° C. The sheets were run through Mathis horizontal pond size press type 5607 at 2 m/min (2 Bar). Temperature of the size press nip was set to 65° C. In the Examples 1 and 2 the sheets were dried at 95° C. using a PTI laboratory sheet dryer for 1 minute per side. In the Example 3 the sheets were dried at 95° C. using an AMC drum dryer at speed 50, giving drying time of 1.5 minutes.

Sizing efficiency was determined by measuring Cobb60 sizing degree according to standard ISO 535. Compression strength was studied in cross-machine direction (CD) using short-span compression test (SCT) method designed based on the standard ISO 9895:1989 (Paper and board. Compressive strength. Short span test). However, deviating from the standard, number or parallel measurements was typically 8 instead of 20. For normal SCT measurement samples were pre-conditioned at RH 50% and 23° C. according to the standard ISO 187:1990 (Paper, board, and pulps. Standard atmosphere for conditioning and testing and procedure for monitoring the atmosphere and conditioning of samples). For tropical SCT measurement samples were pre-conditioned in a climate cabinet at RH90% and 38° C. at least for 4 h, usually overnight.

Surface size compositions were prepared by heating the lignin-hemicellulose complex solution to the sizing temperature and mixing aluminium compound to the lignin-hemicellulose complex solution prior to the surface sizing. In the examples where starch was used in the surface size composition, starch was first dissolved in water according to its common starch cooking instructions and then the dissolved starch in solution form was blended with the lignin-hemicellulose complex solution at the sizing temperature. In Examples 1 and 2 starch was C*film 07312 and in Examples 3 and 4 Raisamyl 01121. Aluminium compound was added to the mixture of lignin-hem icellulose complex and starch prior to the surface sizing.

Example 1

Both test and reference surface size compositions having 8 weight-% dry solids content were prepared according to the description above. Test composition 3 had 12 weight-% dry solids content.

In References compositions 2 and 3 lignosulfonate (Ufoxane, Borregaard, Norway) was used instead of a lignin-hemicellulose complex obtained from Ecohelix AB, Sweden (MW ca 31 000 g/mol, charge density about −2.15, at pH 7).

The components of the surface size compositions are given in Table 1. Weight-% of each component is given as weight-% of the dry solids.

TABLE 1

Surface size compositions used in Example 1.

| | Lignin-hemicellulose complex | Starch | Lignosulfonate |
|---|---|---|---|
| Test Composition 1 | 100 | — | — |
| Test Composition 2 | 33 | 67 | — |
| Test Composition 3 | 33 | 67 | — |
| Reference composition 1 | — | 100 | — |
| Reference composition 2 | — | — | 100 |
| Reference composition 3 | — | 67 | 33 |

The surface size compositions were tested as such and with addition of polyaluminium solution, PAC, in dosages 1.3, 2.5, and 3.9 weight-% of the solids content. Used polyaluminium solution contained aluminium $Al^{3+}$ 9 weight-%; $Al_2O_3$ 17 weight-%; chloride $Cl^-$ 21 weight-%; basicity 42%. The sizing results are given in Table 2.

TABLE 2

Sizing performance of the surface size compositions of Example 1.

| | Amount of PAC solution in the composition, w-% of the solids content | | | |
|---|---|---|---|---|
| | 0 | 1.3 | 2.5 | 3.9 |
| | Cobb60 g/m² | | | |
| Test Composition 1 | 137 | 119 | 82 | 34 |
| Test Composition 2 | 129 | 52 | 30 | 26 |
| Test Composition 3 | 125 | 33 | 28 | 27 |
| Reference composition 1 | 120 | 99 | 88 | 70 |
| Reference composition 2 | 118 | Precipitation of the composition, no proper sizing | | |
| Reference composition 3 | 119 | Precipitation of the composition, no proper sizing | | |

Example 2

Surface size compositions having 12 weight-% dry solids content was prepared according to the description above.

In Reference Composition 4 lignosulfonate (Ufoxane, Borregaard, Norway) was used instead of lignin-hemicellulose complex (same as in Example 1). The components of the surface size compositions are given in Table 3. Weight-% for each component is given as weight-%, calculated from total dry solids.

The surface size compositions were tested as such and with addition of 39 weight-% aluminium sulphate solution in dosages 3.6, 7.3, and 10.9 weight-% of the solids content of the surface size composition. The sizing results are given in Table 4.

TABLE 3

Surface size compositions of Example 2.

| | Lignin-hemicellulose complex | Starch | Lignosulfonate |
|---|---|---|---|
| Test Composition 4 | 33 | 67 | — |
| Reference composition 4 | — | 67 | 33 |

TABLE 4

Sizing performance of the surface size compositions of Example 2.

| | Aluminium sulphate solution in a surface size composition w-% of the solids content | | | |
|---|---|---|---|---|
| | 0 | 3.6 | 7.3 | 10.9 |
| | | Cobb60 g/m² | | |
| Test Composition 4 | 120 | 79 | 65 | 61 |
| Reference composition 4 | 119 | 112 | 107 | 100 |

Example 3

Example 3 studies the effect of lignin-hemicellulose complex (Ecohelix AB, Sweden) as partial replacement of starch in a surface size composition.

Following surface size compositions having 12 weight-% dry solids content were prepared according to the description above:

Size A: 100% starch, reference
Size B: 90% starch, 10% lignin-hemicellulose complex
Size C: 80% starch, 20% Lignin-hemicellulose complex
Size D: 70% starch, 30% Lignin-hemicellulose complex Ratios of the components in the surface size compositions are given as weight-% of dry solids.

The obtained strength and hydrophobicity results are given in Table 5.

TABLE 5

Sizing performance results for the surface size compositions of Example 3.

| Surface size composition | RH50%, 23 C.: CD SCT index Nm/g | RH90%, 38 C.: CD SCT index Nm/g | Cobb 60 s g/m² |
|---|---|---|---|
| Size A, reference | 21.2 | 10.5 | 102 |
| Size B | 20.5 | 11.1 | 101 |
| Size C | 21.6 | 12.6 | 114 |
| Size D | 21.0 | 11.8 | 126 |

Example 4

Example 4 studies the effect of lignin-hemicellulose complex as partial replacement of starch, together with polyaluminium chloride (PAC) in a surface size composition. Lignin-hemicellulose complex and polyaluminium chloride are as defined in Example 1.

Following surface size compositions having 12 weight-% dry solids content were prepared according to the description above:

Size A1: 100% starch, reference
Size B1: 100% starch, 2% PAC
Size C1: 90% starch, 10% Lignin-hemicellulose complex, 2% PAC
Size D1: 80% starch, 20% Lignin-hemicellulose complex, 2% PAC
Size E1: 70% starch, 30% Lignin-hemicellulose complex, 2% PAC
Size F1: 90% starch, 10% Lignin-hemicellulose complex, 1% PAC
Size G1: 80% starch, 20% Lignin-hemicellulose complex, 1% PAC
Size H1: 70% starch, 30% Lignin-hemicellulose complex, 1% PAC Ratios of the components in the surface size compositions are given as weight-% of dry solids.

The obtained strength and hydrophobicity results are given in Table 6.

TABLE 6

Sizing performance results for the surface size compositions of Example 4.

| Surface size composition | RH50%, 23 C.: CD SCT index Nm/g | RH90%, 38 C. CD SCT index Nm/g | Cobb 60 s g/m² |
|---|---|---|---|
| Size A1, reference | 20.4 | 8.9 | 106 |
| Size B1, reference | 20.5 | 9.1 | 35 |
| Size C1 | 21.0 | 9.6 | 23 |
| Size D1 | 20.8 | 9.2 | 22 |
| Size E1 | 20.2 | 10.2 | 23 |
| Size F1 | 20.6 | 8.6 | 25 |
| Size G1 | 20.2 | 9.0 | 26 |
| Size H1 | 20.5 | 8.6 | 25 |

The project leading to this application has received funding from the Bio Based Industries Joint Undertaking (JU) under grant agreement No 837866. The JU receives support from the European Union's Horizon 2020 research and innovation programme and the Bio Based Industries Consortium.

Even if the invention was described with reference to what at present seems to be the most practical and preferred embodiments, it is appreciated that the invention shall not be limited to the embodiments described above, but the invention is intended to cover also different modifications and equivalent technical solutions within the scope of the enclosed claims.

The invention claimed is:

1. A surface size composition for surface sizing of paper or board, wherein the composition comprises at least an aluminium compound and an anionic lignin-carbohydrate complex, where lignin and carbohydrate are covalently bound with each other, and wherein the lignin-carbohydrate complex has a weight average molecular weight MW>12 000 g/mol.

2. The surface size composition according to claim 1, wherein the anionic lignin-carbohydrate complex comprises anionic functional groups selected from sulfonate groups, carboxyl groups and/or phenolic groups.

3. The surface size composition according to claim 1, wherein the lignin-carbohydrate complex has the weight average molecular weight MW>15 000 g/mol.

4. The surface size composition according to claim 1, wherein the lignin-carbohydrate complex has an anionic charge density less than −0.2 meq/g, measured at pH 7.

5. The surface size composition according to claim 4, wherein the lignin-carbohydrate complex has the anionic charge density from −0.2 meq/g to −2.5 meq/g, measured at pH 7.

6. The surface size composition according to claim 1, wherein the lignin-carbohydrate complex has a lignin:carbohydrate ratio from 90:10 to 10:90.

7. The surface size composition according to claim 1, the lignin-carbohydrate complex comprises galactose, glucose, mannose, arabinose, xylose, and/or their residues, which are covalently bound to a lignin.

8. The surface size composition according to claim 1, wherein the composition comprises the anionic lignin-carbohydrate complex in an amount of 5-100 weight-%, calculated from a dry solids content of the surface size composition.

9. The surface size composition according to claim 1, wherein the aluminium compound is selected from polyaluminum chlorides, alum, and aluminium sulphates.

10. The surface size composition according to claim 1, wherein the composition comprises the aluminium compound in an amount of 0.01-6, given as weight-% of aluminium ions in dry solids of the surface size composition.

11. The surface size composition according to claim 1, wherein the composition further comprises a polysaccharide selected from starch and a starch derivative.

12. The surface size composition according to claim 11, wherein the composition comprises starch in amount of 0-95 weight-%, calculated from the dry solids content of the surface size composition.

13. The surface size composition according to claim 1, wherein the composition has a solids content of 1-30 weight-%, calculated as dry solids.

14. A method to surface-size a sheet-like fibrous substrate of paper or board, wherein the method comprises a step of applying on the sheet-like fibrous substrate the surface size composition of claim 1.

15. The method according to claim 14, wherein the sheet-like fibrous substrate is a board comprising recycled fibres.

16. The surface size composition according to claim 1, wherein the lignin-carbohydrate complex has the weight average molecular weight MW>20 000 g/mol.

17. The surface size composition according to claim 1, wherein the lignin-carbohydrate complex has an anionic charge density less than −0.5 meq/g, measured at pH 7.

18. The surface size composition according to claim 17, wherein the lignin-carbohydrate complex has the anionic charge density from −0.5 meq/g to −2.4 meq/g, measured at pH 7.

19. The surface size composition according to claim 1, wherein the lignin-carbohydrate complex has a lignin:carbohydrate ratio from 75:25 to 25:75.

20. The surface size composition according to claim 11, wherein the composition comprises starch in amount of 1-91 weight-%, calculated from the dry solids content of the surface size composition.

* * * * *